(12) United States Patent
Fisher et al.

(10) Patent No.: US 10,197,937 B2
(45) Date of Patent: Feb. 5, 2019

(54) ELECTROSTATIC INK COMPOSITIONS

(71) Applicant: HP Indigo B.V., Amstelveen (NL)

(72) Inventors: Gil Fisher, Shoham (IL); Benjamin Dayan, Tel Aviv (IL); Yana Reznick, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/547,685

(22) PCT Filed: Apr. 28, 2015

(86) PCT No.: PCT/EP2015/059206
§ 371 (c)(1),
(2) Date: Jul. 31, 2017

(87) PCT Pub. No.: WO2016/173628
PCT Pub. Date: Nov. 3, 2016

(65) Prior Publication Data
US 2018/0031996 A1 Feb. 1, 2018

(51) Int. Cl.
G03G 9/135 (2006.01)
C09D 11/02 (2014.01)
C09D 11/03 (2014.01)
C09D 11/06 (2006.01)
G03G 9/12 (2006.01)
G03G 9/13 (2006.01)
C09D 11/037 (2014.01)
G03G 9/125 (2006.01)

(52) U.S. Cl.
CPC ........... *G03G 9/1355* (2013.01); *C09D 11/02* (2013.01); *C09D 11/03* (2013.01); *C09D 11/037* (2013.01); *C09D 11/06* (2013.01); *G03G 9/122* (2013.01); *G03G 9/125* (2013.01); *G03G 9/131* (2013.01); *G03G 9/135* (2013.01)

(58) Field of Classification Search
CPC ...... G03G 9/135; G03G 9/122; G03G 9/1355; G03G 9/131; G03G 13/10
See application file for complete search history.

(56) References Cited

U.S. PATENT DOCUMENTS

| | | | |
|---|---|---|---|
| 3,878,120 A * | 4/1975 | Nagashima | G03G 9/125 430/113 |
| 3,993,483 A * | 11/1976 | Maki | G03G 9/131 430/114 |
| 3,997,456 A | 12/1976 | Voss et al. | |
| 3,998,746 A * | 12/1976 | Tsuneda | G03G 9/13 430/114 |
| 4,052,325 A * | 10/1977 | Santilli | G03G 9/132 430/114 |
| 4,055,419 A | 10/1977 | Voss et al. | |
| 4,060,493 A * | 11/1977 | Tsubuko | G03G 9/122 430/113 |
| 4,259,428 A * | 3/1981 | Tsuneda | G03G 9/131 430/115 |
| 4,702,984 A * | 10/1987 | El-Sayed | G03G 9/131 430/115 |
| 4,760,009 A | 7/1988 | Larson | |
| 4,764,446 A | 8/1988 | Croucher et al. | |
| 4,798,778 A | 1/1989 | El-Sayed Lyla M. et al. | |
| 4,923,778 A | 5/1990 | Blair et al. | |
| 5,920,756 A | 7/1999 | Matsuda et al. | |
| 8,148,039 B2 | 4/2012 | Qi et al. | |
| 8,765,342 B2 | 7/2014 | Wu | |
| 2008/0003513 A1 | 1/2008 | Yanus et al. | |
| 2009/0311614 A1 * | 12/2009 | Almog | B82Y 30/00 430/115 |
| 2013/0065176 A1 * | 3/2013 | Momotani | G03G 9/125 430/114 |
| 2013/0288175 A1 * | 10/2013 | Chun | G03G 13/10 430/112 |

FOREIGN PATENT DOCUMENTS

| | | |
|---|---|---|
| EP | 0336386 | 10/1989 |
| WO | WO 2007/130069 | 11/2007 |
| WO | WO 2011/046563 | 4/2011 |
| WO | WO 2013/007307 | 1/2013 |
| WO | WO 2013/062530 | 5/2013 |
| WO | WO 2013/107498 | 7/2013 |
| WO | WO 2014/015897 | 1/2014 |
| WO | WO 2014/016112 | 1/2014 |
| WO | WO 2015/058785 | 4/2015 |
| WO | WO 2016/008548 | 1/2016 |

OTHER PUBLICATIONS

Diamond, Arthur S. (ed). Handbook of Imaging Material. New York: Marcel-Dekker, Inc. (2001) pp. 242-247, 254-257.*
International Search Report and Written Opinion for International Application No. PCT/EP2015/059206 dated Jan. 25, 2016, 11 pages.
"What is the Z-Average Size Determined by DLS?" Horiba Scientific, 7 pages.
"Tackifier Families", Eastman TM Tackifier Center, 2 pages. http://www.eastman.co./Markets/Tackifier_Center/Tackifier_Families/Pages/Tackifier_Families.aspx.

* cited by examiner

*Primary Examiner* — Christopher D Rodee
(74) *Attorney, Agent, or Firm* — HP Inc. Patent Department

(57) ABSTRACT

Herein is disclosed an electrostatic ink composition. The composition may comprise: pigment particles; a dispersant; a carrier liquid; a charge director comprising lecithin or a sulfate-based lipophilic moiety; and a tackifier which is dissolved in the carrier liquid.

16 Claims, 1 Drawing Sheet

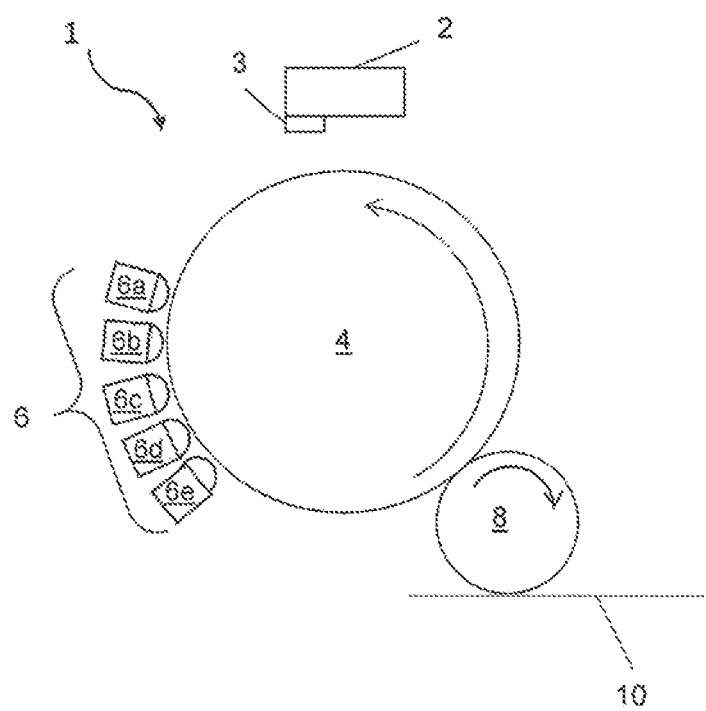

ELECTROSTATIC INK COMPOSITIONS

BACKGROUND

Electrostatic printing processes typically involve creating an image on a photoconductive surface, applying an ink having charged particles to the photoconductive surface, such that they selectively bind to the image, and then transferring the charged particles in the form of the image to a print substrate.

The photoconductive surface is typically on a cylinder and is often termed a photo imaging plate (PIP). The photoconductive surface is selectively charged with a latent electrostatic image having image and background areas with different potentials. For example, an electrostatic ink composition comprising charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member and then to the print substrate.

BRIEF DESCRIPTION OF THE FIGURES

The FIGURE is a schematic illustration of a liquid electro photographic (LEP) printing apparatus.

DETAILED DESCRIPTION

Before the electrostatic ink compositions and related aspects are disclosed and described, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a", "an", and "the" include plural references unless the context clearly dictates otherwise.

As used herein, "liquid carrier", "carrier liquid," "carrier," or "carrier vehicle" refers to the fluid in which pigment particles, charge directors, tackifiers and/or other additives can be dispersed to form a liquid electrostatic ink composition, or a fluid in which resin particles, charge directors and/or other additives may be dispersed to form a liquid resin composition. Such carrier liquids and vehicle components are known in the art. Typical carrier liquids can include a mixture of a variety of different agents, such as surfactants, co-solvents, viscosity modifiers, and/or other possible ingredients.

As used herein, the term "insoluble resin" is used generally to refer to resins which are insoluble in a carrier liquid of the electrostatic ink composition described herein.

As used herein, "electrostatic ink composition" generally refers to an ink composition that is typically suitable for use in an electrostatic printing process, sometimes termed an electrophotographic printing process. The electrostatic ink composition may include chargeable pigment particles dispersed in a liquid carrier, which may be as described herein.

As used herein, "copolymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly, or indirectly via an intermediate transfer member, to a print substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrostatic ink composition to an electric field, e.g. an electric field having a field gradient of 1000 V/cm or more, or in some examples 1500 V/cm or more.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, the term "at least some of the" is used to mean at least 10 wt %, in some examples at least 20 wt %, in some examples at least 30 wt %, in some examples at least 40 wt %, in some examples at least 50 wt %, in some examples at least 60 wt %, in some examples at least 70 wt %, in some examples at least 75 wt %, in some examples at least 80 wt %, in some examples at least 85 wt %, in some examples at least 90 wt %, in some examples at least 95 wt %, of the component referred to.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Unless otherwise stated, any feature described herein can be combined with any aspect or any other feature described herein.

In an aspect, there is provided an electrostatic ink composition. The electrostatic ink composition may comprise:
pigment particles;
a dispersant;
a carrier liquid;
a charge director comprising lecithin or a sulfate-based lipophilic moiety; and
a tackifier which is dissolved in the carrier liquid.

In an aspect, there is provided an electrostatic ink composition. The electrostatic ink composition may comprise:
pigment particles;
a dispersant;
a carrier liquid; and
a charge director comprising lecithin or a sulfate-based lipophilic moiety.

In another aspect, there is provided a method of producing an electrostatic ink composition. The method may comprise:
providing a base printing composition comprising:
pigment particles;
a dispersant; and
a carrier liquid,
adding a charge director and a tackifier to the base printing composition, wherein the charge director comprises a lecithin moiety or a sulfate-based lipophilic moiety and the tackifier is dissolved in the carrier liquid.

There is also provided a base printing composition comprising:
pigment particles;
a dispersant; and
a carrier liquid.

There is also provided a packaged base printing composition, wherein the base printing composition comprises:
pigment particles;
a dispersant; and
a carrier liquid.

In another aspect, there is provided an electrostatic printing method. The method may comprise:
providing an electrostatic ink composition;
contacting the electrostatic ink composition with a latent electrostatic image on a surface to create a developed pigment image;
transferring the developed pigment image to a print substrate, the electrostatic ink composition comprising:
pigment particles;
a dispersant;
a carrier liquid; and
a charge director comprising lecithin or a sulfate-based lipophilic moiety.

In some examples, the electrostatic ink composition provided in the electrostatic printing method further comprises a tackifier which is dissolved in the carrier liquid.

In some examples, the electrostatic printing method further comprises:
providing a resin composition;
contacting the resin composition with a latent electrostatic image on a surface to create a developed resin image; and
transferring the developed resin image to the print substrate, such that the resin image is disposed on the pigment image on the print substrate.

Carrier Liquid

The electrostatic ink composition may further comprise carrier liquid. In some examples, the mixing of the pigment and the dispersant is carried out in a carrier liquid (i.e. the pigment and dispersant are mixed in a liquid carrier) and/or the grinding of the dispersion is carried out in a liquid carrier (i.e. the pigment dispersion may be ground in the presence of a liquid carrier). In some examples, in the electrostatic ink composition, pigment particles and the dispersant may be dispersed in the carrier liquid. The carrier liquid can include or be a hydrocarbon, silicone oil, vegetable oil, etc. The carrier liquid can include, but is not limited to, an insulating, non-polar, non-aqueous liquid that can be used as a medium for pigment particles, i.e. the chargeable pigment particles. The carrier liquid can include compounds that have a resistivity in excess of about 109 ohm-cm. The carrier liquid may have a dielectric constant below about 5, in some examples below about 3.

The carrier liquid can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the carrier liquids include, but are not limited to, aliphatic hydrocarbons, isoparaffinic compounds, paraffinic compounds, dearomatized hydrocarbon compounds, and the like. In particular, the carrier liquids can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

The carrier liquid can constitute about 20% to 99.5% by weight of the electrostatic ink composition, in some examples 50% to 99.5% by weight of the electrostatic ink composition. The carrier liquid may constitute about 40 to 90% by weight of the electrostatic ink composition. The carrier liquid may constitute about 60% to 80% by weight of the electrostatic ink composition. The carrier liquid may constitute about 90% to 99.5% by weight of the electrostatic ink composition, in some examples 95% to 99% by weight of the electrostatic ink composition.

In some examples, the carrier liquid constitutes at least 20 wt. % of the base printing composition. The carrier liquid can constitute about 20% to 99.5% by weight of the base printing composition, in some examples 40% to 99.5% by weight of the base printing composition. The carrier liquid may constitute about 40 to 90% by weight of the base printing composition. The carrier liquid may constitute about 50% to 80% by weight of the base printing composition.

The electrostatic ink composition, when printed on a print substrate, may be substantially free from liquid carrier. In an electrostatic printing process and/or afterwards, the liquid carrier may be removed, e.g. by an electrophoresis processes during printing and/or evaporation, such that substantially just solids are transferred to the print substrate. Substantially free from liquid carrier may indicate that the ink printed on the print substrate contains less than 5 wt % liquid carrier, in some examples, less than 2 wt % liquid carrier, in some examples less than 1 wt % liquid carrier, in some examples less than 0.5 wt % liquid carrier. In some examples, the electrostatic ink composition printed on the print substrate is free from liquid carrier.

Pigment Particles

In some examples, the pigment particles consist of a pigment or a combination of pigments.

In some examples, the pigment particles are free from resin, for example, free from resin which is insoluble in the carrier liquid.

In some examples, the electrostatic ink composition comprises substantially no insoluble resin. In some examples, the electrostatic ink composition comprises less than 10 wt. % by total solids content of the composition of insoluble resin. In some examples, the electrostatic ink composition comprises less than 5 wt. % by total solids content of the composition of insoluble resin. In some examples, the electrostatic ink composition comprises less than 1 wt. % by total solids content of the composition of insoluble resin. In some examples, the electrostatic ink composition comprises less than 0.5 wt. % by total solids content of the composition of insoluble resin. In some examples, the electrostatic ink composition comprises less than 0.1 wt. % by total solids content of the composition of insoluble resin. In some examples, the electrostatic ink composition comprises less than 0.01 wt. % by total solids content of the composition of insoluble resin.

In some examples, the base printing composition comprises substantially no insoluble resin. In some examples the base printing composition comprises less than 10 wt. % by total solids content of the composition of insoluble resin, in some examples less than 5 wt. %, in some examples less than 1 wt %, in some examples less than 0.1 wt. %, in some examples less than 0.01 wt. % by total solids content of the composition of insoluble resin.

The pigment may be selected from a cyan pigment, a yellow pigment, a magenta pigment, a white pigment and a black pigment. The electrostatic ink composition and/or ink printed on the print substrate may include a plurality of pigment particles. The electrostatic ink composition and/or ink printed on the substrate may include a first pigment particle and a second pigment particle which are different from one another. Further pigments may also be present with the first and second pigments. The electrostatic ink composition and/or ink printed on the substrate may include first and second pigments where each is independently selected from a cyan pigment, a yellow pigment, a magenta pigment, a white pigment and a black pigment. In some examples, the first pigment includes a black pigment, and the second pigment includes a non-black pigment, for example a pigment selected from a cyan pigment, a yellow pigment and a magenta pigment. The pigment may be selected from a phthalocyanine pigment, an indigold pigment, an indanthrone pigment, a monoazo pigment, a diazo pigment, inorganic salts and complexes, dioxazine pigment, perylene pigment, anthraquinone pigments, and any combination thereof. The second or additional pigments may be added in order to shift the first pigment ink to a desired color in color space. The first pigment may be present in a quantity greater than the second pigment.

In some examples the pigment particles may comprise any pigment, or combinations of pigments, that are compatible with the liquid carrier and useful for electrostatic printing. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200. Where the pigment is a white pigment particle, the pigment particle may be selected from the group consisting of $TiO_2$, calcium carbonate, zinc oxide, and mixtures thereof. In some examples the white pigment particle may comprise an alumina-$TiO_2$ pigment.

The pigment particles may constitute at least 50 wt % of the solids of the electrostatic ink composition, in some examples at least 55 wt % of the solids of the electrostatic ink composition, in some examples at least 60 wt % of the solids of the electrostatic ink composition, in some examples at least 65 wt % of the solids of the electrostatic ink composition, in some examples at least 75 wt % of the solids of the electrostatic ink composition. In some examples the pigment may constitute from 65 wt % to 98 wt % of the solids of the electrostatic ink composition.

In some examples, the electrostatic ink composition comprises at least 0.1 wt. % pigment particles by total weight of the composition, in some examples at least 1 wt. %, in some examples at least 2 wt. %.

In some examples, the electrostatic ink composition comprises up to 10 wt. % pigment particles by total weight of the composition.

In some examples, the base printing composition comprises at least 1 wt. % pigment particles by total weight of the composition, in some examples at least 5 wt. %, in some examples at least 10 wt. %, in some examples at least 20 wt. %, in some examples at least 30 wt. %.

In some examples, the base printing composition comprises up to 75 wt. % pigment particles by total weight of the composition.

In some examples, the pigment particles may constitute greater than about 60 wt. % of the solids of the base printing composition, in some examples greater than about 70 wt. %, in some examples greater than about 75 wt. %, in some examples greater than about 80 wt. %, in some examples greater than about 85 wt. % of the solids of the base printing composition. In some examples the pigment may constitute from about 65 wt % to 99 wt % of the solids of the base printing composition.

In some examples, at least some of the pigment particles have a particle size of less than 2 µm. In some examples, at least some of the pigment particles have a particle size of less than 1 µm. In some examples, at least some of the pigment particles have a particle size of less than 0.8 µm. In some examples, at least some of the pigment particles have a particle size of less than 0.75 µm. In some examples, at least some of the pigment particles have a particle size of less than 0.5 µm.

In some examples, at least some of the pigment particles have a particle size of greater than 0.05 microns, in some examples greater than 0.1 microns.

As used herein, the term "particle size" of the pigment particles refers to the diameter of the particles determined, for example, using a lab tool obtained from Malvern, such as a dynamic light scattering tool.

In some examples, the number average particle size of the pigment particles is less than 2 µm, in some examples less than 1 µm, in some examples less than 0.8 µm, in some examples less than 0.75 µm, in some examples less than 0.5 µm.

In some examples, the number average particle size of the pigment particles is greater than 0.05 microns, in some examples greater than 0.1 microns.

The particle size of the pigment particles can be determined using microscopy and a light scattering analytical tool. For example, the particle size may be measure using SEM, Malvern dynamic light scattering (DLS) or laser diffraction (LD) equipment.

In some examples, the pigment is acidic. An acidic pigment may be defined as a pigment that, when in water at 20° C., has a pH value of less than 7, in some examples less than 6, in some examples less than 5, in some examples less than 4, in some examples less than 3. An acidic pigment may be defined as a particulate pigment that has acidic groups on the surface of the particles of the pigment. Methods of determining the pH of a substance are well known to the skilled person, for example the method described in ISO Standard 31-8 Annex C. pH may be measured in water at 20° C.

Acidic pigments are commercially available. The pigment may comprise a carbon black. Carbon black pigments typically have chemisorbed oxygenated complexes, which are acidic (e.g., carboxylic, quinonic, lactonic or phenolic groups) on their surface. These acidic groups on the pigment surface provide binding sites for basic dispersants, such as those comprising amine. This acid-base interaction is stronger than the Van der Waal's forces or hydrogen bonding, resulting in a strong absorption of the dispersant to the pigment.

Other pigments with acidic surfaces, where either the pigment itself contains acidic groups or its surface has been modified by agents containing acidic groups such as sulfonic, phosphoric, or carboxylic acid groups, are equally useful in this disclosure.

Accordingly, the pigment may be a particulate pigment having containing acidic groups on the surface of the particles of the pigments, and, in some examples the acidic groups may be selected from sulfonic, phosphoric and carboxylic acid groups. The pigment may be selected from azo, anthraquinone, thioindigo, oxazine, isoindoline, quinacridone, lakes and toners of acidic dye stuffs, copper phthalocyanine and its derivatives, and various mixtures and modifications thereof.

In some examples, the pigment is basic. A basic pigment may be defined as a pigment that, when in water at 20° C., has a pH value of 7 or greater, in some examples greater than 8, in some examples greater than 9, in some examples greater than 10, in some examples greater than 11. A basic pigment may be defined as a particulate pigment that has basic groups on the surface of the particles of the pigment.

Basic pigments are commercially available. The basic pigment may be selected from inorganic salts of metals, for example those of titanium, zinc, lead, bismuth, calcium, copper and iron. The basic pigment may be selected from zinc-based pigments (e.g. zinc white, zinc oxide), lead-based pigments (e.g. lead white, lead sulfides, lead sulphates, lead cyanamide and red lead oxide), and copper-based pigments (e.g. copper carbonate, copper chromate). Other pigments may contain one or more groups selected from amino, phosphoric acid groups and salts thereof, highly electronegative elements such as Oxygen or Sulphur or halogens, and basic groups such as deprotonated hydroxyl, alkoxy anion etc.

Dispersant

Dispersants can be two-component structures, comprising a head group, which can provide strong adsorption onto the surface of the pigment particle and a tail group.

In some examples, the dispersant comprises a succinimide.

In some examples, the dispersant is a basic dispersant and comprises a basic head group, e.g. an amine group. In some examples, the dispersant is a dispersant having a basic head group, for example an amine, capable of being absorbed on to the surface of a pigment particle and a succinimide attached to the basic head group.

In some examples, the dispersant is an acidic dispersant having an acidic head group, e.g. a carboxylic acid group. In some examples, the dispersant is a dispersant having an acidic, for example a carboxylic acid group, capable of being absorbed on to the surface of a pigment particle and a succinimide attached to the acidic head group.

In some examples, the dispersant may be an acidic dispersant. An acidic dispersant may be defined as a dispersant that, when in water at 20° C., has a pH value of less than 7, in some examples less than 6, in some examples less than 5, in some examples less than 4, in some examples less than 3.

In some examples, the dispersant may be a basic dispersant. A basic dispersant may be defined as a dispersant that, when in water at 20° C., has a pH value of 7 or greater, in some examples greater than 8, in some examples greater than 9, in some examples greater than 10, in some examples greater than 11.

In some examples, the dispersant may be selected in order to possess opposite acid/base chemistries to the pigment of the pigment particle.

In some examples, the dispersant is or comprises a polymeric dispersant. In some examples, each polymeric dispersant molecule comprises one polymer chain or a plurality of polymer chains. In some examples, each polymeric dispersant molecule comprises one polymer chain having a single head group, for example an amine group.

In some examples, each polymeric dispersant molecule comprises one polymer chain having a plurality of head groups, for example a plurality of amine groups. In some examples, the polymer chain has acidic side groups.

In some examples, the polymeric dispersant comprises a co-polymer. In some examples, the polymeric dispersant comprises a block co-polymer having multiple head groups, for example an ABA block co-polymer or a BAB block co-polymer or a random copolymer. In some examples, the polymeric dispersant comprises a comb co-polymer.

Basic polymeric dispersants include SOLSPERSE® 11200, SOLSPERSE® 13300; the SOLPLUS® series, by the same manufacturer (e.g., SOLPLUS® K500). Other polymeric dispersants that can be used as or with the dispersants described herein include others in the SOLSPERSE® series manufactured by Lubrizol Corp., Wickliffe, Ohio (e.g., SOLSPERSE® 3000, SOLSPERSE® 8000, SOLSPERSE® 9000, SOLSPERSE® 13840, SOLSPERSE® 16000, SOLSPERSE® 17000, SOLSPERSE® 18000, SOLSPERSE® 19000, SOLSPERSE® 20000, SOLSPERSE® 21000, SOLSPERSE® 27000, or SOLSPERSE® 43000); various dispersants manufactured by BYKchemie, Gmbh, Germany, (e.g., DISPERBYK® 106, DISPERBYK® 110, DISPERBYK® 163, DISPERBYK® 170 or DISPERBYK® 180); various dispersants manufactured by Evonik Goldschmidt GMBH LLC, Germany, (e.g., TEGO® 630, TEGO® 650, TEGO® 651, TEGO® 655, TEGO® 685 or TEGO® 1000); various dispersants manufactured by Sigma-Aldrich, St. Louis, Mo., (e.g., SPAN® 20, SPAN® 60, SPAN® 80 or SPAN® 85); or various dispersants manufactured by Petrolite Corp., St. Louis, Mo. (e.g., Ceramar™ 1608 and Ceramar™ X-6146, etc.).

In some examples, the dispersant is or comprises a succinimide. The succinimide may be linked, e.g. via a hydrocarbon-containing linker group, to an amine group. In some examples, the dispersant comprises a polyisobutylene succinimide having a head group comprising an amine.

In some examples, the dispersant is of formula (I)

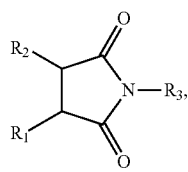

formula (I)

wherein $R_1$, $R_2$ and $R_3$ are selected from an amine-containing head group, a hydrocarbon tail group and hydrogen, wherein at least one of $R_1$, $R_2$ and $R_3$ comprises a hydrocarbon tail group,
at least one of $R_1$, $R_2$ and $R_3$ comprises an amine-containing head group. In some examples, $R_1$ and $R_2$ are selected from a hydrocarbon tail group and hydrogen, with at least one of $R_1$ and $R_2$ comprising a hydrocarbon tail group, and $R_3$ comprises an amine-containing head group. The hydrocarbon tail group may comprise or be a hydrocarbon group, which may be branched or straight chain and may be unsubstituted. The hydrocarbon tail group may comprise or be a hydrocarbon group containing a polyalkylene, which may be selected from a polyethylene, polypropylene, polybutylene. In some examples, the hydrocarbon tail group may contain a polyisobutylene. The hydrocarbon tail group may contain from 10 to 100 carbons, in some examples from 10 to 50 carbons, in some examples from 10 to 30 carbons. The hydrocarbon tail group may be of the formula (II)

P-L- formula (II), wherein P is or comprises polyisobutylene and L is selected from a single bond, $(CH_2)_n$, wherein n is from 0 to 5, in some examples 1 to 5, —O— and —NH—. In some examples, the amine-containing head group comprises or is a hydrocarbon group having an amine group attached to one of the carbons of the hydrocarbon group. In some examples, the amine-containing head group is of the formula (III)

$(CH_2)_m[(CH_2)_oNH(CH_2)_p]_q(CH_2)_r$—$NH_2$ formula (III), wherein m is at least 1, in some examples 1 to 5, q is 0 to 10, o is 0, 1 or 2, p is 1 or 2, r is 0 to 10; in some examples, m is 1, o is 1, p is 1 and q is from 0 to 10, in some examples from 1 to 5, and in some examples r is 1 to 5; in some examples m is 1, q is 0 to 10, in some examples 1 to 10, in some examples 1 to 5, o is 1, p is 1, r is 1.

In some examples, the dispersant is of formula (I), wherein $R_1$ is of formula (II), $R_2$ is H and $R_3$ is of formula (III). In some examples, the dispersant is of formula (I), wherein $R_1$ is of formula (II), wherein L is —$CH_2$—, $R_2$ is H and $R_3$ is of formula (III), wherein m is 1, q is 0 to 10, in some examples 1 to 10, in some examples 1 to 5, o is 1, p is 1 and r is 1. In some examples, the dispersant is or comprises polyisobutylene succimide polyethylene amine non ionic dispersant. In some examples, the dispersant is or comprises Solperse® J560 and/or Lubrizol® 6406.

In some examples, the dispersant is or comprises an alkyl succinimide amido salt, in some examples a polyisobutylene succinimide amido salt, in some examples an alkyl succinimide amido amino salt, in some examples polyisobutylene succimide amido ammonium salt, and in some examples the polyisobutylene succinimide amido ammonium salt comprises a plurality of amido and/or ammonium groups, and in some examples the polyisobutylene succinimide amido ammonium salt comprises at least one branched group, e.g. a branched alkyl group, and a plurality of amido and/or ammonium groups, which may be attached, directly or indirectly to the at least one branched group. In some examples, the dispersant is or comprises OS 13309, which is available from Lubrizol Corporation.

In some examples, the dispersant is a basic dispersant having a total base number (TBN) of at least 5 mgKOH/gr material, in some examples a TBN of at least 10 mgKOH/gr material, in some examples a TBN of at least 20 mgKOH/gr material, in some examples a TBN of at least 30 mgKOH/gr material, in some examples from 5 mgKOH/gr material to 150 mgKOH/gr material, in some examples from 5 mgKOH/gr material to 150 mgKOH/gr material, in some examples from 20 mgKOH/gr material to 140 mgKOH/gr material, in some examples from 5 mgKOH/gr material to 50 mgKOH/gr material, in some examples from 10 mgKOH/gr material to 30 mgKOH/gr material, in some examples from 15 mgKOH/gr material to 25 mgKOH/gr material, in some examples from 15 mgKOH/gr material to 20 mgKOH/gr material.

In some examples, the dispersant is a basic dispersant having a total base number (TBN) of from 30 mgKOH/gr material to 60 mgKOH/gr material, in some examples from 35 mgKOH/gr material to 55 mgKOH/gr material, in some examples about 45 mgKOH/gr material.

In some examples, the dispersant is a basic dispersant having a total base number (TBN) of at least 100 mgKOH/gr material, in some examples from 100 mgKOH/gr material to 140 mgKOH/gr material, in some examples from 100 mgKOH/gr material to 140 mgKOH/gr material, in some examples from 110 mgKOH/gr material to 130 mgKOH/gr material, in some examples from 115 mgKOH/gr material to 120 mgKOH/gr material.

Total base number (TBN), sometimes simply referred to as base number, may be determined using standard techniques, including, those laid out in ASTM Designation D4739-08, such as Test Method D2896, Test Method D4739, and ASTM Designation D974-08, with Test Method D2896 being used if any discrepancy is shown between test methods, and unless otherwise stated, the test method(s) will be the most recently published at the time of filing this patent application. "mgKOH/gr material" indicates "mgKOH per gram of dispersant". The measurement of TBN of the dispersant can either be on the pure dispersant, or a dispersant in a hydrocarbon liquid, such 60 wt % dispersant in white spirit, e.g. dearomatized white spirit, and then adjusted as if it had been measured on the pure dispersant.

In some examples, the dispersant, which may comprises a succinimide, which may be as described above, has a molecular weight (MW) of from 500 Daltons to 10,000 Daltons, in some examples a MW of from 1000 to 6,000 Daltons, in some examples a MW of from 1000 to 6,000 Daltons, in some examples a MW of from 1000 to 5000 Daltons, in some examples a MW of from 2000 to 4000 Daltons, in some examples a MW of about 3000 Daltons, or in some examples a MW of from 500 to 3000 Daltons, in some examples a MW of from 1000 to 2000 Daltons, in some examples a MW of from 1200 to 1800 Daltons, in some examples a MW of from 1300 to 1500 Daltons, in some examples a MW of 1400 Daltons.

In some examples, the dispersant comprises an ester of an optionally substituted fatty acid, in some examples an ester of an optionally substituted hydroxy fatty acid. A fatty acid may be defined as a carboxyl group covalently bonded to a hydrocarbon chain (e.g. a C12 to C22 carbon chain), which may be saturated or unsaturated, and a hydroxy fatty acid is one in which at least one carbon of the hydrocarbon chain of the fatty acid is substituted with a hydroxyl group. In some examples, the dispersant comprises an ester of an hydroxy fatty acid (the carboxyl group being esterified) in which the hydroxyl group has a substituent thereon, and the substituent may be selected from an optionally substituted alkyl ester (e.g. C1 to C6, e.g. C2 to C4, e.g. C3) or an optionally substituted alkyl amide, wherein the substituent (if present) of the alkyl of the optionally substituted alkyl ester or optionally substituted alkyl amide is a salt, e.g. a trimethyl ammonium salt. In some examples, the dispersant, which may be an oligomeric dispersant, comprises a saturated or unsaturated ricinoleic acid ester capped with a propyl amide terminus connected to tri methyl ammonium salt. In some examples, the dispersant is or comprises Solplus® K500, available from Lubrizol.

The % AOWP (the percentage agent on the weight of pigment) is the number of grams of dispersant per 100 g of pigment. In some examples, the % AOWP of the dispersion is from 1% to 70%, in some examples from 1% to 60%, in some examples from 5% to 55%, in some examples from 10% to 50%, in some examples from 10% to 40%, in some examples from 10% to 30%, in some examples from 15% to 25%.

The dispersant may constitute from 0.1 wt % to 12 wt % of the electrostatic ink composition, in some examples 0.5 wt % to 6 wt % the electrostatic ink composition, in some examples 1 wt % to 6 wt % of the electrostatic ink composition, in some examples 2 wt % to 4 wt % of the electrostatic ink composition.

The dispersant may constitute from 0.1 wt % to 50 wt % of the solids of the electrostatic ink composition, in some examples 0.5 wt % to 30 wt % of the solids of the electrostatic ink composition, in some examples 1 wt % to 25 wt % of the solids of the electrostatic ink composition, in some examples 1 wt % to 20 wt % of the solids of the electrostatic ink composition, in some examples 5 wt % to 15 wt % of the solids of the electrostatic ink composition, in some examples 8 wt % to 12 wt % of the solids of the electrostatic ink composition, in some examples about 10 wt % of the solids of the electrostatic ink composition.

The dispersant may constitute from 0.1 wt % to 10 wt % of the base printing composition, in some examples from 1 wt % to 10 wt % of the base printing composition.

The dispersant may constitute from about 0.1 wt % to 50 wt % of the solids of the base printing composition, in some examples 0.5 wt % to 30 wt % of the solids of the base printing composition, in some examples 1 wt % to 25 wt % of the solids of the base printing composition.

Tackifier

The electrostatic ink composition includes a tackifier which is dissolved in the carrier liquid.

The tackifer is soluble in a hydrocarbon carrier liquid. In some examples, the tackifier is capable of forming a film when an electrostatic ink composition comprising a tackier is printed on a print substrate.

In some examples, the tackifier is selected from rosin resins, hydrocarbon resins, terpene resins, copolymers of vinyl acrylate and combinations thereof.

In some examples, rosin resins include any of wood rosin, gum rosin, or by-products of the paper making process (tall oil rosin). In some examples, the utility of rosin resins may be improved via several chemical modifications. These modifications may include esterification, hydrogenation, dimerization, functionalization, or any combination of these. Rosin resins, unlike hydrocarbon resins, are not considered to be polymers. Rosin resins may be a blend of distinct molecules.

Rosin resins may be a mixture of eight closely related rosin acids characterized by three fused six-carbon rings, double bonds that vary in number and location, and a single carboxylic acid group. An example of this family is a dimerized rosic acid with an acid number of 145 and softening point of 144° C.

Hydrocarbon resins include petroleum based aliphatic (C5), aromatic (C9), DCPD (dicyclopentadiene), or mixtures of these. An example is the Regalite™ hydrogenated hydrocarbon resins by Eastman.

Terpene Resins, which may also be referred to as "universal tackifiers", may be derived from terpene feedstocks either from wood sources or citrus fruit.

Examples of copolymers of vinyl acrylate include Plioway Ultra 200 by Eliokem (Omnova) or derivatives of.

In some examples, the electrostatic ink composition comprises about 5 wt. % or less of tackifier by total weight of the composition. In some examples, the electrostatic ink composition comprises about 3 wt. % or less of tackifier by total weight of the composition. In some examples, the electrostatic ink composition comprises about 2 wt. % or less of tackifier by total weight of the composition. In some examples, the electrostatic ink composition comprises about 1 wt. % or less of tackifier by total weight of the composition.

In some examples, the electrostatic ink composition comprises at least about 0.01 wt. % of tackifier by total weight of the composition. In some examples, the electrostatic ink composition comprises at least about 0.1 wt. % of tackifier by total weight of the composition. In some examples, the electrostatic ink composition comprises at least about 0.3 wt. % of tackifier by total weight of the composition.

Charge Director

The electrostatic ink composition includes a charge director comprising lecithin or a sulfate-based lipophilic moiety In some examples, the charge director is a sulfate-based lipophilic moiety. In some examples, the electrostatic ink composition includes a charge director comprising a sulfosuccinate salt of the general formula MAn, wherein M is a metal, n is the valence of M, and A is an ion of the general formula (1):

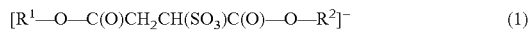

$$[R^1—O—C(O)CH_2CH(SO_3^-)C(O)—O—R^2]^- \quad (1)$$

wherein each of $R^1$ and $R^2$ is an alkyl group. The charge director may be as described in WO2007130069, which is incorporation herein by reference in its entirety.

The charge director may be added in order to impart and/or maintain sufficient electrostatic charge on the ink particles, which may be particles comprising the pigment, the resin and the dispersant.

As described in WO2007130069, the sulfosuccinate salt of the general formula MAn is an example of a micelle forming salt. The charge director may be substantially free or free of an acid of the general formula HA, where A is as described above. The charge director may include micelles of said sulfosuccinate salt enclosing at least some of the nanoparticles. The charge director may include at least some nanoparticles having a size of 200 nm or less, and/or in some examples 2 nm or more.

The charge director may further comprise a simple salt. As described in WO2007130069, simple salts are salts that do not form micelles by themselves, although they may form a core for micelles with a micelle forming salt. The ions constructing the simple salts are all hydrophilic. The simple salt may include a cation selected from the group consisting of Mg, Ca, Ba, NH4, tert-butyl ammonium, Li+, and Al+3, or from any sub-group thereof. The simple salt may include an anion selected from the group consisting of $SO_4^{2-}$, $PO^{3-}$, $NO^{3-}$, $HPO_4^{2-}$, $CO_3^{2-}$, acetate, trifluoroacetate (TFA), $Cl^-$, $BF_4^-$, $F—$, $ClO_4—$, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)3$, $LiClO_4$ and $LiBF_4$, or any sub-group thereof. The charge director may further include basic barium petronate (BBP).

In the formula $[R_1—O—C(O)CH_2CH(SO_3^-)C(O)—O—R_2]$, in some examples each of $R_1$ and $R_2$ is an aliphatic alkyl group. In some examples, each of $R_1$ and $R_2$ independently is a C6-25 alkyl. In some examples, said aliphatic alkyl group is linear. In some examples, said aliphatic alkyl group is branched. In some examples, said aliphatic alkyl group includes a linear chain of more than 6 carbon atoms. In some examples, $R_1$ and $R_2$ are the same. In some examples, at least one of $R_1$ and $R_2$ is $C_{13}H_{27}$. In some examples, M is Na, K, Cs, Ca, or Ba. The formula $[R_1—O—C(O)CH_2CH(SO_3^-)C(O)—O—R_2]$ and/or the formula MAn may be as defined in any part of WO2007130069.

In some examples, the charge director may include one of, some of or all of (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In some examples, the charge director constitutes about 0.001% to 20%, in some examples 0.01% to 20% by weight, in some examples 0.01 to 10% by weight, in some examples 0.01% to 1% by weight of the solids of an electrostatic ink composition. In some examples, the charge director constitutes about 0.001% to 0.15% by weight of the solids of the electrostatic ink composition, in some examples 0.001% to 0.15%, in some examples 0.001% to 0.02% by weight of the solids of an electrostatic ink composition, in some examples 0.1% to 2% by weight of the solids of the electrostatic ink composition, in some examples 0.2% to 1.5% by weight of the solids of the electrostatic ink composition in some examples 0.1% to 1% by weight of the solids of the electrostatic ink composition, in some examples 0.2% to 0.8% by weight of the solids of the electrostatic ink composition. In some examples, the charge director is present in an amount of at least 1 mg of charge director per gram of solids of the electrostatic ink composition (which will be abbreviated to mg/g), in some examples at least 2 mg/g, in some examples at least 3 mg/g, in some examples at least 4 mg/g, in some examples at least 5 mg/g. In some examples, the moderate acid is present in the amounts stated above, and the charge director is present in an amount of from 1 mg to 50 mg of charge director per gram of solids of the electrostatic ink composition (which will be abbreviated to mg/g), in some examples from 1 mg/g to 25 mg/g, in some examples from 1 mg/g to 20 mg/g, in some examples from 1 mg/g to 15 mg/g, in some examples from 1 mg/g to 10 mg/g, in some examples from 3 mg/g to 20 mg/g, in some examples from 3 mg/g to 15 mg/g, in some examples from 10 mg/g to 15 mg/g, in some examples from 5 mg/g to 10 mg/g.

In some examples, the weight:weight ratio of the charge director to the dispersant is from 1:1 to 1:1000, for example from 1:10 to 1:500, for example from 1:10 to 1:200, for example from 1:10 to 1:150, for example from 1:30 to 1:120, for example from 1:40 to 1:110, for example from 1:60 to 1:100.

In some examples, the weight:weight ratio of the charge director to the dispersant is from 1:2 to 1:30, for example from 1:3 to 1:20, for example from 1:4 to 1:20, for example from 1:5 to 1:20, for example from 1:7 to 1:20, for example from 1:8 to 1:20, for example from 1:10 to 1:20, for example from 1:12 to 1:20, for example from 1:15 to 1:20, for example from 1:3 to 1:15, for example from 1:3 to 1:10, for example from 1:3 to 1:8, for example from 1:3 to 1:6, for example from 1:3 to 1:6, for example from 1:4 to 1:15, for example from 1:5 to 1:12, for example from 1:5 to 1:10, for example from 1:6 to 1:8.

In some examples, the charge director is present in an amount of from 3 mg/g to 20 mg/g, in some examples from 3 mg/g to 15 mg/g, in some examples from 10 mg/g to 15 mg/g, in some examples from 5 mg/g to 10 mg/g, and the weight:weight ratio of the charge director to the dispersant is from 1:1 to 1:1000, for example from 1:10 to 1:500, for example from 1:10 to 1:200, for example from 1:10 to 1:150, for example from 1:30 to 1:120, for example from 1:40 to 1:110, for example from 1:60 to 1:100.

In some examples, the charge director is present in an amount of from 3 mg/g to 15 mg/g, in some examples from 10 mg/g to 15 mg/g, and the weight:weight ratio of the charge director to the dispersant is from 1:10 to 1:150, for example from 1:30 to 1:120, for example from 1:40 to 1:110, for example from 1:60 to 1:100.

In some examples, the charge director is present in an amount of from 3 mg/g to 15 mg/g, in some examples from 10 mg/g to 15 mg/g, and the weight:weight ratio of the charge director to the dispersant is from 1:60 to 1:100.

When calculating the weight:weight ratio of the charge director to the dispersant, the weight of the charge director is taken as the weight of the sulfosuccinate salt according to the present disclosure, plus any other component(s) of the charge directors that may be present (e.g. the simple salt, as described above).

Charge Adjuvant

In some examples, the electrostatic ink composition may further include a charge adjuvant. A charge adjuvant may promote charging of the particles when a charge director is present. The method as described here may involve adding a charge adjuvant at any stage. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or includes aluminum di- or tristearate. The charge adjuvant may be present in an amount of about 0.1 to 5% by weight, in some examples about 0.1 to 1% by weight, in some examples about 0.3 to 0.8% by weight of the solids of the electrostatic ink composition, in some examples about 1 wt % to 3 wt % of the solids of the electrostatic ink composition, in some examples about 1.5 wt % to 2.5 wt % of the solids of the electrostatic ink composition.

In some examples, the electrostatic ink composition further includes, e.g. as a charge adjuvant, a salt of multivalent cation and a fatty acid anion. The salt of multivalent cation and a fatty acid anion can act as a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation includes a metal selected from Ca, Sc, Ti, V, Cr, Mn, Fe, Co, Ni, Cu, Zn, Al and Pb. In some examples, the multivalent cation is Al3+. The fatty acid anion may be selected from a saturated or unsaturated fatty acid anion. The fatty acid anion may be selected from a $C_8$ to $C_{26}$ fatty acid anion, in some examples a $C_{14}$ to $C_{22}$ fatty acid anion, in some examples a $C_{16}$ to $C_{20}$ fatty acid anion, in some examples a $C_{17}$, $C_{18}$ or $C_{19}$ fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

The charge adjuvant, which may, for example, be or include a salt of multivalent cation and a fatty acid anion, may be present in an amount of 0.1 wt % to 5 wt % of the solids of the electrostatic ink composition, in some examples in an amount of 0.1 wt % to 2 wt % of the solids of the electrostatic ink composition, in some examples in an amount of 0.1 wt % to 2 wt % of the solids of the electrostatic ink composition, in some examples in an amount of 0.3 wt % to 1.5 wt % of the solids of the electrostatic ink composition, in some examples about 0.5 wt % to 1.2 wt % of the solids of the electrostatic ink composition, in some examples about 0.8 wt % to 1 wt % of the solids of the electrostatic ink composition, in some examples about 1 wt % to 3 wt % of the solids of the electrostatic ink composition, in some examples about 1.5 wt % to 2.5 wt % of the solids of the electrostatic ink composition.

In some examples, the electrostatic ink composition does not comprise a charge adjuvant.

Other Additives

The electrostatic ink composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like.

In some examples, the electrostatic ink composition comprises a surfactant. In some examples, the surfactant may be soluble in the liquid carrier. In some examples, the surfactant may be an oil-soluble surfactant. In some examples, the surfactant may be a surfactant soluble in a hydrocarbon liquid carrier.

In some examples, the surfactant may be selected from anionic surfactant, cationic surfactant, amphoteric surfactant, non-ionic surfactant, polymeric surfactant, oligomeric surfactant, crosslinking surfactant, or combinations thereof.

In some examples, an anionic surfactant may be or comprise sulfosuccinic acid and derivatives thereof such as, for instance, alkyl sulfosuccinates (e.g., GEROPON® SBFA-30 and GEROPON® SSO-75, both of which are manufactured by Rhodia, Boulogne-Billancourt, France) and docusate sodium.

In some examples, a cationic surfactant may be selected from quaternary amine polymers, protonated amine polymers, and polymers containing aluminum (such as those that are available from Lubrizol Corp., Wickliffe, Ohio). Further examples of cationic surfactants include SOLSPERSE® 2155, 9000, 13650, 13940, and 19000 (Lubrizol Corp.) and other like cationic surfactants.

Method of Producing an Electrostatic Ink Composition

In some examples, the method of producing an electrostatic ink composition may comprise:

providing a base printing composition comprising:
  pigment particles;
  a dispersant; and
  a carrier liquid,
adding a charge director and a tackifier to the base printing composition, wherein the charge director comprises a lecithin moiety or a sulfate-based lipophilic moiety and the tackifier is dissolved in the carrier liquid.

In some examples, providing a base printing composition comprises mixing pigment particles, a carrier liquid, e.g. a first carrier liquid, and a dispersant, optionally to form a pigment dispersion. In some examples, further carrier liquid or an additional carrier liquid, e.g. a second carrier liquid, may then be added to the pigment dispersion.

In some examples, providing a base printing composition comprises grinding pigment particles and a dispersant, optionally to form a pigment dispersion. In some examples, the pigment particles and dispersant may be ground in the presence of a carrier liquid, e.g. a first carrier liquid. In some examples further carrier liquid or an additional carrier liquid, e.g. a second carrier liquid, may be added to the pigment particles and the dispersant before and/or after grinding.

In some examples, the charge director is combined with the pigment, dispersant and carrier liquid of the base printing composition. In some examples, the charge director is mixed with a carrier liquid, e.g. a third carrier liquid, before being added to the base printing composition.

In some examples, the tackifier is combined with the pigment, dispersant and carrier liquid of the base printing composition.

In some examples, the charge director is mixed with, and dissolved in, a carrier liquid, e.g. a fourth carrier liquid, before being added to the base printing composition.

In some examples, the charge director and the tackifier together are combined with the pigment, dispersant and carrier liquid of the base printing composition. In some examples, the charge director and the tackifier are mixed with a carrier liquid, e.g. a fourth carrier liquid, before being added to the base printing composition.

In the above examples, the first liquid carrier, the second liquid carrier, the third carrier liquid and/or the fourth liquid carrier can be the same or different liquid carriers, and may be as described above. The fourth and/or third and/or second liquid carrier can be a further volume of the first liquid carrier and/or the second liquid carrier and/or the third liquid carrier.

In the above examples, mixing components together may also involve grinding components together. In some examples, the grinding of takes place in an agitated small media mill.

Method of Electrostatic Printing

In some examples, the electrostatic printing method may comprise:
providing an electrostatic ink composition;
contacting the electrostatic ink composition with a latent electrostatic image on a surface to create a developed pigment image;
transferring the developed pigment image to a print substrate,
the electrostatic ink composition comprising:
pigment particles;
a dispersant;
a carrier liquid; and
a charge director comprising lecithin or a sulfate-based lipophilic moiety,
wherein either:
(a) the electrostatic ink composition further comprises a tackifier which is dissolved in the carrier liquid; or
(b) the method further comprises:
providing a resin composition;
contacting the resin composition with a latent electrostatic image on a
surface to create a developed resin image; and
transferring the developed resin image to the print substrate, such that the resin image is disposed on the pigment image on the print substrate.

In some examples, wherein the electrostatic ink composition comprises a tackifier which is dissolved in the carrier liquid, the method comprises:
providing a resin composition;
contacting the resin composition with a latent electrostatic image on a surface to create a developed resin image; and
transferring the developed resin image to the print substrate, such that the resin image is disposed on the pigment image on the print substrate.

In some examples, transferring the developed resin image and the pigment image to the print substrate produces a layered image on the print substrate comprising the resin image disposed on the pigment image on the print substrate.

In some examples, the resin composition is contacted with a latent electrostatic image on a surface to create a developed resin image prior to contacting the electrostatic ink composition with a latent electrostatic image on a surface to create a developed pigment image.

In some examples, the latent electrostatic image with which the electrostatic ink composition is contacted, e.g. the pigment latent electrostatic image, is a different electrostatic image to the latent electrostatic image with which the resin composition is contacted, e.g. the resin latent electrostatic image.

In some examples, the electrostatic printing method comprises:
contacting the electrostatic ink composition with a pigment latent electrostatic image on a surface to create a developed pigment image;
contacting the resin composition with a resin latent electrostatic image on the surface to create a developed resin image disposed on the developed pigment image on the surface; and
transferring the developed pigment image and the developed resin image to a print substrate such that the developed resin image is disposed on the developed pigment image on the print substrate.

In some examples, the electrostatic printing method comprises:
providing an electrostatic ink composition;
contacting the electrostatic ink composition with a latent electrostatic image on a surface to create a developed pigment image;
transferring the developed pigment image to a print substrate, the electrostatic ink composition comprising:
pigment particles;
a dispersant;
a carrier liquid; and
a charge director comprising lecithin or a sulfate-based lipophilic moiety.

In some examples, the electrostatic ink composition provided in the electrostatic printing method further comprises a tackifier which is dissolved in the carrier liquid.

In some examples, the method comprises providing a resin composition on the developed pigment image on the print substrate such that the resin composition is disposed on the developed pigment image on the print substrate. In some examples, the resin composition may be electrostatically printed on the developed pigment image on the print substrate.

Resin Composition

In some examples, the resin composition may be any composition suitable for being printed electrostatically. In some example, the resin may be any LEP printing composition comprising resin particles and a carrier liquid, for examples comprising resin which is insoluble in the carrier liquid.

In some examples the resin composition is transparent. In some examples, the resin composition may be any transparent LEP printing composition, e.g. ElectroInk®, obtained from Hewlett-Packard Company.

In some examples, the resin composition is colourless, for examples comprises substantially no pigment.

In some examples, the resin composition comprises an insoluble resin and a carrier liquid. In some examples, the resin composition comprises an insoluble resin, a carrier liquid and a charge director. In some examples, the resin composition comprises a resin, a carrier liquid, a charge director and a charge adjuvant.

An insoluble resin is a resin which is insoluble in the carrier liquid.

The carrier liquid and any charge director or charge adjuvant containing in the LEP printing composition may be as described herein. The amounts of carrier liquid, charge director or charge adjuvant described in relation to the electrostatic ink composition described herein also apply to the amounts of carrier liquid, charge director or charge adjuvant that may be contained in the resin composition.

Insoluble Resin

The insoluble resin typically includes a polymer. The insoluble resin can include, but is not limited to, a thermoplastic polymer. In some examples, the polymer of the insoluble resin may be selected from ethylene acrylic acid copolymers; ethylene methacrylic acid copolymers; ethylene vinyl acetate copolymers; copolymers of ethylene (e.g. 80 wt % to 99.9 wt %), and alkyl (e.g. C1 to C5) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl is, in some examples, from 1 to about 20 carbon atoms, such as methyl methacrylate (e.g. 50 wt % to 90 wt %)/methacrylic acid (e.g. 0 wt % to 20 wt %)/ethylhexylacrylate (e.g. 10 wt % to 50 wt %)); ethylene-acrylate terpolymers:ethylene-acrylic esters-maleic anhydride (MAH) or glycidyl methacrylate (GMA) terpolymers; ethylene-acrylic acid ionomers and combinations thereof.

The insoluble resin may comprise a polymer having acidic side groups. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The insoluble resin may comprise a polymer, in some examples a polymer having acidic side groups, that has a melt flow rate of less than about 60 g/10 minutes, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of in some examples about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitute from 5 wt % to about 25 wt % of the copolymer, in some examples from 10 wt % to about 20 wt % of the copolymer.

The insoluble resin may comprise two different polymers having acidic side groups. The two polymers having acidic side groups may have different acidities, which may fall within the ranges mentioned above. The insoluble resin may comprise a first polymer having acidic side groups that has an acidity of from 50 mg KOH/g to 110 mg KOH/g and a second polymer having acidic side groups that has an acidity of 110 mg KOH/g to 130 mg KOH/g.

The insoluble resin may comprise two different polymers having acidic side groups: a first polymer having acidic side groups that has a melt flow rate of about 10 g/10 minutes to about 50 g/10 minutes and an acidity of from 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The insoluble resin may comprise two different polymers having acidic side groups: a first polymer that is a copolymer of ethylene (e.g. 92 to 85 wt %, in some examples about 89 wt %) and acrylic or methacrylic acid (e.g. 8 to 15 wt %, in some examples about 11 wt %) having a melt flow rate of 80 to 110 g/10 minutes and a second polymer that is a copolymer of ethylene (e.g. about 80 to 92 wt %, in some examples about 85 wt %) and acrylic acid (e.g. about 18 to 12 wt %, in some examples about 15 wt %), having a melt viscosity lower than that of the first polymer, the second polymer for example having a melt viscosity of 15000 poise or less, in some examples a melt viscosity of 10000 poise or less, in some examples 1000 poise or less, in some examples 100 poise or less, in some examples 50 poise or less, in some examples 10 poise or less. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

In any of the insoluble resins mentioned above, the ratio of the first polymer having acidic side groups to the second polymer having acidic side groups can be from about 10:1 to about 2:1. In another example, the ratio can be from about 6:1 to about 3:1, in some examples about 4:1.

The insoluble resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The insoluble resin may comprise a first polymer having a melt viscosity of 15000 poise or more, in some examples 20000 poise or more, in some examples 50000 poise or more, in some examples 70000 poise or more; and in some examples, the insoluble resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The insoluble resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If the insoluble resin comprises a single type of resin polymer, the resin polymer (excluding any other components of the resin composition) may have a melt viscosity of 6000 poise or more, in some examples a melt viscosity of 8000 poise or more, in some examples a melt viscosity of 10000 poise or more, in some examples a melt viscosity of 12000 poise or more. If the insoluble resin comprises a plurality of polymers all the polymers of the insoluble resin may together form a mixture (excluding any other components of the resin composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The insoluble resin may comprise two different polymers having acidic side groups that are selected from copolymers of ethylene and an ethylenically unsaturated acid of either methacrylic acid or acrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The insoluble resin may comprise (i) a first polymer that is a copolymer of ethylene and an ethylenically unsaturated acid of either acrylic acid and methacrylic acid, wherein the ethylenically unsaturated acid of either acrylic or methacrylic acid constitutes from 8 wt % to about 16 wt % of the copolymer, in some examples 10 wt % to 16 wt % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from 12 wt % to about 30 wt % of the copolymer, in some examples from 14 wt % to about 20 wt % of the copolymer, in some examples from 16 wt % to about 20 wt % of the copolymer in some examples from 17 wt % to 19 wt % of the copolymer.

In an example, the insoluble resin constitutes about 5 to 90%, in some examples about 5 to 80%, by weight of the solids of the resin composition. In another example, the insoluble resin constitutes about 10 to 60% by weight of the solids of the resin composition. In another example, the insoluble resin constitutes about 15 to 40% by weight of the solids of the resin composition. In another example, the insoluble resin constitutes about 60 to 95% by weight, in some examples from 80 to 90% by weight, of the solids of the resin composition.

The insoluble resin may comprise a polymer having acidic side groups, as described above (which may be free of ester side groups), and a polymer having ester side groups. The polymer having ester side groups is, in some examples, a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1 to 50% by weight of the co-polymer, in some examples 5 to 40% by weight, in some examples 5 to 20% by weight of the copolymer, in some examples 5 to 15% by weight of the copolymer. The second monomer may constitute 1 to 50% by weight of the co-polymer, in some examples 5 to 40% by weight of the co-polymer, in some examples 5 to 20% by weight of the co-polymer, in some examples 5 to 15% by weight of the copolymer. In an example, the first monomer constitutes 5 to 40% by weight of the co-polymer, the second monomer constitutes 5 to 40% by weight of the co-polymer, and with the third monomer constituting the remaining weight of the copolymer. In an example, the first monomer constitutes 5 to 15% by weight of the co-polymer, the second monomer constitutes 5 to 15% by weight of the co-polymer, with the third monomer constituting the remaining weight of the copolymer. In an example, the first monomer constitutes 8 to 12% by weight of the co-polymer, the second monomer constitutes 8 to 12% by weight of the co-polymer, with the third monomer constituting the remaining weight of the copolymer. In an example, the first monomer constitutes about 10% by weight of the co-polymer, the second monomer constitutes about 10% by weight of the co-polymer, and with the third monomer constituting the remaining weight of the copolymer. The polymer having ester side groups may be selected from the Bynel® class of monomer, including Bynel 2022 and Bynel 2002, which are available from DuPont®.

The polymer having ester side groups may constitute 1% or more by weight of the total amount of the resin polymers in the insoluble resin, e.g. the total amount of the polymer or polymers having acidic side groups and polymer having ester side groups. The polymer having ester side groups may constitute 5% or more by weight of the total amount of the resin polymers in the insoluble resin, in some examples 8% or more by weight of the total amount of the resin polymers in the insoluble resin, in some examples 10% or more by weight of the total amount of the resin polymers in the insoluble resin, in some examples 15% or more by weight of the total amount of the resin polymers in the insoluble resin, in some examples 20% or more by weight of the total amount of the resin polymers in the insoluble resin, in some examples 25% or more by weight of the total amount of the resin polymers in the insoluble resin, in some examples 30% or more by weight of the total amount of the resin polymers in the insoluble resin, in some examples 35% or more by weight of the total amount of the resin polymers in the insoluble resin.

The polymer having ester side groups may constitute from 5% to 50% by weight of the total amount of the resin polymers in the insoluble resin, in some examples 10% to 40% by weight of the total amount of the resin polymers in the insoluble resin, in some examples 15% to 30% by weight of the total amount of the polymers in the insoluble resin.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

In an example, the polymer or polymers of the insoluble resin can be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of toners (e.g. Aaclyn 201, Aclyn 246, Aclyn 285, and Aclyn 295), and the Lotader family of toners (e.g. Lotader 2210, Lotader, 3430, and Lotader 8200 (sold by Arkema)).

The FIGURE shows a schematic illustration of a Liquid Electro Photographic (LEP) printing apparatus which may be used to print an electrostatic ink composition described herein. An image, including any combination of graphics, text and images, may be communicated to the LEP printing apparatus 1. According to an illustrative example, in order to print the electrostatic ink composition, firstly, the photo charging unit 2 deposits a uniform static charge on the photo-imaging cylinder 4 and then a laser imaging portion 3 of the photo charging unit 2 dissipates the static charges in selected portions of the image area on the photo-imaging cylinder 4 to leave a latent electrostatic image. The latent electrostatic image is an electrostatic charge pattern representing the image to be printed. The electrostatic ink composition is then transferred to the photo-imaging cylinder 4 by Binary Ink Developer (BID) units 6. The BID units 6 present a uniform film of electrostatic ink composition to the photo-imaging cylinder 4. An electrical potential is applied between the BID units 6 and the latent electrostatic image such that pigment particles of the electrostatic ink composition provided by the BID units 6 are electrically charged. By virtue of an appropriate electrical potential, the charged electrostatic ink composition is then attracted to the latent electrostatic image on the photo-imaging cylinder 4. The electrostatic ink composition does not adhere to the uncharged, non-image areas and forms a developed pigment image on the surface of the latent electrostatic image. The photo-imaging cylinder 4 then has a developed pigment image on its surface.

The developed pigment image is then transferred from the photo-imaging cylinder 4 to the intermediate transfer member (ITM) 8 by virtue of an appropriate potential applied between the photo-imaging cylinder 4 and the ITM 8, such that the charged electrostatic ink composition is attracted to the ITM 8. The developed pigment image is then dried and fused on the ITM 8 before being transferred to a print substrate 10.

In some examples, the LEP printing apparatus 1 may be used to print a multi-coloured image on the print substrate. In such examples, the method of electrostatic printing may comprise providing different coloured electrostatic ink compositions, e.g. electrostatic ink compositions comprising different coloured pigment particles, for example CMKY electrostatic ink compositions. The LEP printing apparatus 1 may comprise a BID unit 6 for each different coloured electrostatic ink composition, for example, a first BID unit 6a may contain an electrostatic ink composition comprising cyan pigment particles, a second BID unit 6b may contain an electrostatic ink composition comprising magenta pigment particles, a third BID unit 6c may contain an electrostatic ink composition comprising black pigment particles, and a fourth BID unit 6d may contain an electrostatic ink composition comprising yellow pigment particles. In other examples, the BID units may contain other electrostatic ink compositions or additional BID units may be provided containing further colours of electrostatic ink composition, e.g. an electrostatic ink composition comprising white pigment particles.

In some examples, the multi-coloured image on the print substrate is obtained in one pass of the print substrate 10 through the LEP printing apparatus 1. In such a method, a latent electrostatic image on the surface of the photo-imaging cylinder 4, a first coloured electrostatic ink printing composition is then transferred from a first BID unit 6a to the photo-imaging cylinder 4 to form first electrostatic ink composition image on the photo-imaging cylinder 4. In this one pass method, the first electrostatic ink composition image is then transferred from the photo-imaging cylinder 4 to the ITM 8. A second latent electrostatic image is then formed on the surface of the photo-imaging cylinder 4 and a second coloured electrostatic ink composition image is then formed on the surface of the photo-imaging cylinder 4 and transferred from the surface of the photo-imaging cylinder 4 to the ITM 8 to form a second coloured electrostatic ink composition image disposed on the first coloured electrostatic ink composition image on the ITM 8. Third and fourth coloured electrostatic ink composition images are then formed on top of the second coloured electrostatic ink image disposed on the first coloured electrostatic ink image on the ITM 8 before transfer of the four layers of first, second, third and fourth coloured electrostatic ink images from the ITM 8 to the print substrate.

In some examples, prior to the formation of an electrostatic ink composition image on the photo-imaging cylinder 4, a resin composition, which may be provided in by an additional BID unit 6e, e.g. a fifth BID unit, is contacted with a latent electrostatic image formed on the surface of the photo-imaging cylinder 4 to form a developed resin image on the surface of the photo-imaging cylinder 4. The developed resin image is then transferred to the ITM 8.

In some examples, coloured electrostatic ink composition images may then be built up on top of the developed resin image on the ITM 8 as described above, before transfer of the developed resin image and the developed coloured pigment images to the print substrate to form an image on the print substrate comprising a developed resin image disposed on the coloured developed pigment images.

In some examples, a developed resin image is formed on the ITM 8 in between each different developed pigment image, and the layers of developed resin images and developed pigment images are transferred from the IMT 8 to the print substrate.

In some examples, the multi-coloured image on the print substrate is obtained following multiple passes of the print substrate 10 through the LEP printing apparatus 1. In this example, a first coloured developed pigment image may be formed on the photo-imaging cylinder 4 and transferred to the print substrate 10 via the ITM 8. Additional coloured developed pigment images may then be formed on top of the first coloured developed pigment image on the print substrate 10 as the print substrate undergoes additional passes through the LEP printing apparatus 1.

In some examples, a resin composition, which may be provided in by an additional BID unit 6e, e.g. a fifth BID unit, may then be transferred to the photo-imaging cylinder 4 by electrical forces to form a developed resin image on the surface of the photo-imaging cylinder 4. The developed resin image may then be transferred to the ITM 8 and then to the print substrate 10 as the print substrate 10 undergoes a further pass through the LEP printing apparatus 1, such that the resin image is disposed on the coloured pigment images on the print substrate.

In some examples, in both the single and multi-pass methods, a developed resin image is formed on the photo-imaging cylinder 4 and transferred to the ITM 8 between the formation of each different coloured developed pigment image, such that the print substrate obtained comprises alternating layers of coloured developed pigment images and developed resin images.

In some examples, a pigment latent electrostatic image is formed on the surface of the photo-imaging cylinder 4. A first coloured electrostatic ink composition is then transferred from a first BID unit 6a to the photo-imaging cylinder 4. Then a resin latent electrostatic image is formed on the surface of the photo-imaging cylinder 4, optionally using a second photo-charging unit and lasing portion (not shown), and a resin composition is transferred from a fifth BID unit 6e to the photo-imaging cylinder 4, such that the developed resin image is disposed on the first coloured developed pigment image on the photo-imaging cylinder 4. The first coloured developed pigment image and the developed resin image are then transferred from the photo-imaging cylinder 4 to the ITM 8. Then the first coloured developed pigment image and the developed resin image on the ITM 8 may be transferred to a print substrate 10, or remain on the ITM 8 to receive further layers of coloured developed pigment images and/or developed resin images.

EXAMPLES

Example 1

A cyan base printing composition was prepared by grinding for 1 hour using a bead mill (Eiger) 30 wt. % cyan pigment particles (cyan 15:3 by BASF, a phthalocyanine cyan pigment) with 2 wt. % Lubrizol 6402 as a dispersant which was pre-dissolved isopar L. The Z-average size of the cyan pigment particles after grinding was found to be 175-570 nm (using a Malvern Zetasizer and confirmed using SEM).

The cyan base printing composition obtained was found to maintain the particle size achieved on grinding for at least a week at room temperature.

A cyan electrostatic ink composition was prepared by adding a charge director (micelles of sulfosuccinate salt) in an amount of 1 mg/1 g of pigment, diluting the resulting composition to 1 wt % total solids with Isopar L and then adding Ultra200 as a tackifier (1/1 ratio to pigment wt/wt).

Example 2

A cyan electrostatic ink composition was prepared according to example 1, except that no tackifier was added to the base printing composition.

Example 3

A magenta base printing composition was prepared by grinding 25 wt. % magenta pigment particles (QUINDO® magenta) with 5 wt. % of a dispersant comprising SOLSPERSE® 9000 and SOLSPERSE® 20000 (1/1 wt/wt ratio) which were pre dissolved in Isopar L as a liquid carrier. The components of the base printing composition were ground for 1 hour using a bead mill (Buhler R60) to obtain magenta pigment particles having a number average particle size of 325-550 nm as determined by Malvern DLS equipment.

A magenta electrostatic ink composition was prepared by adding a charge director barium petronate-based at 0.5 mg/g pigment to the magenta base printing composition.

Regalite, as a tackifier, was pre-dissolved at 1 wt. % in Isopar L and was used to dilute the electrostatic ink composition to 1% wt total solids.

Example 4

A magenta electrostatic ink composition was prepared according to example 3, except that no tackifier was added.

Example 5

A yellow base printing composition was prepared by grinding 33 wt. % yellow pigment particles (CROMOPHTHAL® YELLOW 8 G) with 6 wt. % Lubrizol 6406 as a dispersant pre-dissolved in Isopar L using a bead mill (Eiger) for 45 minutes to obtain yellow pigment particles having a number average particle size of 280-480 nm.

The yellow base printing composition obtained was found to maintain the particle size achieved on grinding for at least a week at room temperature.

A yellow electrostatic ink composition was prepared by diluting the base down to 2.2% wt pigment in isopar L solution and adding a charge director (barium petronate-based at 0.5 mg/g pigment). Regalite which was pre-dissolved at 1% wt in carrier liquid, the carrier liquid comprising Isopar L and 5.wt % Isopar G, was added in an amount to dilute the electrostatic ink composition to 1% wt total solids.

Example 6

A yellow electrostatic ink composition was prepared according to example 5, except that no tackifier was added.

Single colour images were printed using each of the electrostatic ink compositions of Examples 1 to 6 using a LEP printing apparatus as described above in relation to the FIGURE (for these tests an HP Indigo 7xxx digital press was used as the LEP printing apparatus). Each of the electrostatic ink compositions of Examples 1-6 were found to be suitable for printing images to print substrates using a LEP printing apparatus.

The developed mass area (DMA) of each of the single colour images formed using the electrostatic ink compositions of Examples 1-6 was determined. The DMA of each of the images formed from the electrostatic ink compositions of Examples 1-6 was found to be lower for the same optical density (OD) compared to the DMA of corresponding coloured images printed in the same way using reference electrostatic ink compositions comprising insoluble resins.

Multi-coloured CMY images were formed using the electrostatic ink compositions of Examples 1, 3 and 5. Multi-coloured CMY images were formed using the 'single-pass' process and the 'multi-pass' process described above. The inventors found that although possible, it was not necessary to provide a resin composition for printing a print substrate comprising a resin image disposed on the CMY pigment images on the print substrate for the CMY pigment images formed form the electrostatic ink compositions of Examples 1, 3 and 5.

Multi-coloured CMY images were formed using the electrostatic ink compositions of Examples 2, 4 and 6. Multi-coloured CMY images were formed using the 'single-pass' process and the 'multi-pass' process described above and a resin composition was provided such that a print substrate comprising a resin image disposed on the CMY pigment images on the print substrate.

While the electrostatic ink compositions, methods and related aspects have been described with reference to certain examples, those skilled in the art will appreciate that various modifications, changes, omissions, and substitutions can be made without departing from the spirit of the disclosure. It is intended, therefore, that the electrostatic ink compositions, methods and related aspects be limited only by the scope of the following claims. Unless otherwise stated, the features of any dependent claim can be combined with the features of any of the other dependent claims, and any other independent claim.

The invention claimed is:

1. An electrostatic ink composition comprising:
   pigment particles;
   a dispersant comprising a succinimide;
   a carrier liquid;
   a charge director comprising lecithin or a sulfate-based lipophilic moiety; and
   a tackifier which is dissolved in the carrier liquid;
   wherein the composition comprises substantially no insoluble resin.

2. The composition according to claim 1, wherein the tackifier is selected from rosin resins, hydrocarbon resins, terpene resins, copolymers of vinyl acrylate and combinations thereof.

3. The composition according to claim 1, wherein the charge director is a sulfate-based lipophilic moiety.

4. The composition according to claim 3, wherein the charge director comprises a sulfosuccinate salt of the general formula MAn, wherein M is a metal, n is the valence of M, and A is an ion of the general formula (1):

$$[R^1-O-C(O)CH_2CH(SO_3)C(O)-O-R^2]^- \qquad (1)$$

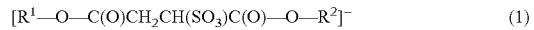

wherein each of $R^1$ and $R^2$ is an alkyl group.

5. The composition according to claim 1, wherein at least some of the pigment particles have a particle size of less than 1 μm.

6. The composition according to claim 1 comprising about 1 wt. % or less of tackifier by the total weight of the composition.

7. The composition according to claim 1, wherein the pigment particles constitute at least 50 wt % of the solids of the electrostatic ink composition.

8. The composition according to claim 1, wherein the succinimide is of formula (I)

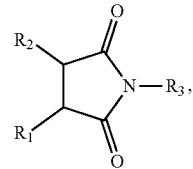

formula (I)

wherein $R_1$, $R_2$ and $R_3$ are selected from the group consisting of an amine-containing head group, a hydrocarbon tail group, and hydrogen;
wherein at least one of $R_1$, $R_2$ and $R_3$ comprises a hydrocarbon tail group; and
wherein at least one of $R_1$, $R_2$ and $R_3$ comprises an amine-containing head group.

9. The composition according to claim 8, wherein the hydrocarbon tail group is of formula (II):

wherein P includes polyisobutylene and L is selected from the group consisting of —O—, —NH—, and —(CH$_2$)$_n$—, wherein n is from 1 to 5.

10. The composition according to claim 8, wherein the amine-containing head group is of formula (III):

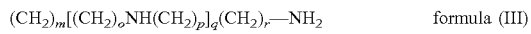

wherein m is at least 1, o is 0, 1 or 2, p is 1 or 2, q is from 0 to 10, and r is from 0 to 10.

11. The composition according to claim 1, further comprising a charge adjuvant.

12. A method of producing an electrostatic ink composition, the method comprising:
providing a base printing composition comprising:
pigment particles;
a dispersant comprising a succinimide; and
a carrier liquid,
adding a charge director and a tackifier to the base printing composition, wherein the charge director comprises a lecithin moiety or a sulfate-based lipophilic moiety and the tackifier is dissolved in the carrier liquid;
wherein the electrostatic ink composition produced comprises substantially no insoluble resin.

13. An electrostatic printing method comprising:
providing an electrostatic ink composition:
contacting the electrostatic ink composition with a latent electrostatic image on a surface to create a developed pigment image;
transferring the developed pigment image to a print substrate,
the electrostatic ink composition comprising:
pigment particles;
a dispersant comprising a succinimide;
a carrier liquid; and a charge director comprising lecithin or a sulfate-based lipophilic moiety, wherein the electrostatic ink composition comprises substantially no insoluble resin;
and wherein the electrostatic ink composition further comprises a tackifier which is dissolved in the carrier liquid.

14. The method according to claim 13, wherein the method comprises:
providing a resin composition; contacting the resin composition with a latent electrostatic image on a surface to create a developed resin image; and transferring the developed resin image to the print substrate, such that the resin image is disposed on the pigment image on the print substrate.

15. The method according to claim 14, wherein the resin composition is contacted with a latent electrostatic image on a surface to create a developed resin image prior to contacting the electrostatic ink composition with a latent electrostatic image on a surface to create a developed pigment image.

16. The method according to claim 14, wherein the pigment particles constitute at least 50 wt % of the solids of the electrostatic ink composition.

* * * * *

UNITED STATES PATENT AND TRADEMARK OFFICE
CERTIFICATE OF CORRECTION

PATENT NO.       : 10,197,937 B2
APPLICATION NO.  : 15/547685
DATED            : February 5, 2019
INVENTOR(S)      : Gil Fisher et al.

It is certified that error appears in the above-identified patent and that said Letters Patent is hereby corrected as shown below:

In the Claims

In Column 30, Line 27, in Claim 16, delete "claim 14," and insert -- claim 13, --, therefor.

Signed and Sealed this
Second Day of July, 2019

Andrei Iancu
*Director of the United States Patent and Trademark Office*